(12) United States Patent
Mahaffey (10) Patent No.: US 10,353,679 B2
(45) Date of Patent: Jul. 16, 2019

(54) COLLECTING PROFILE DATA FOR MODIFIED GLOBAL VARIABLES

(71) Applicant: MICROSOFT TECHNOLOGY LICENSING, LLC., Redmond, WA (US)

(72) Inventor: Terry Jack Mahaffey, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 9 days.

(21) Appl. No.: 14/529,188

(22) Filed: Oct. 31, 2014

(65) Prior Publication Data

US 2016/0124728 A1 May 5, 2016

(51) Int. Cl.
*G06F 9/445* (2018.01)
*G06F 8/41* (2018.01)
*G06F 11/34* (2006.01)
*G06F 11/36* (2006.01)

(52) U.S. Cl.
CPC ............... *G06F 8/443* (2013.01); *G06F 11/34* (2013.01); *G06F 11/3612* (2013.01); *G06F 11/3624* (2013.01); *G06F 11/3644* (2013.01)

(58) Field of Classification Search
CPC .......... G06F 11/3624; G06F 11/3644; G06F 11/3612; G06F 8/443; G06F 9/45516
See application file for complete search history.

(56) References Cited

U.S. PATENT DOCUMENTS

| 5,555,417 | A | | 9/1996 | Odnert et al. |
| 6,059,839 | A | * | 5/2000 | Dehnert ............... G06F 8/443 717/154 |
| 7,143,404 | B2 | | 11/2006 | Haghighat et al. |
| 7,584,462 | B2 | | 9/2009 | Wolff et al. |
| 7,624,389 | B2 | | 11/2009 | Igarashi |

(Continued)

OTHER PUBLICATIONS

Nathaniel McIntosh et al., Whole-Program Optimization of Global Variable Layout, ACM, 2006, retrieved online on Feb. 27, 2019, pp. 164-172. Retrieved from the Internet: <URL: http://delivery.acm.org/10.1145/1160000/1152181/p164-mcintosh.pdf?>. (Year: 2006).*

(Continued)

*Primary Examiner* — Hanh Thi-Minh Bui (57) ABSTRACT

A PGO compiler can instrument an executable to collect profile data from which global variables that were modified during the execution of a training executable can be identified. PGO optimization using a list of modified global variables identified from the profile data can be used to optimize a program in a second compilation phase. The global variables that were modified during the training run are identified by capturing a current snapshot of global variables and comparing their state to a baseline snapshot to ascertain the addresses of global variables that were modified. The addresses that changed can be mapped to global variable names to create a list of global variables that were modified during execution of the training executable. The list of global variables that have been modified can be to enable the compiler to perform optimizations such as but not limited to co-locate the modified global variables in memory.

20 Claims, 7 Drawing Sheets

(56) References Cited

U.S. PATENT DOCUMENTS

| | | | |
|---|---|---|---|
| 7,770,163 B2 | 8/2010 | Stoodley et al. | |
| 7,827,543 B1 | 11/2010 | Kosche et al. | |
| 8,146,070 B2 | 3/2012 | Archambault et al. | |
| 8,578,355 B1 | 11/2013 | Mars et al. | |
| 8,656,377 B2 | 2/2014 | Xu et al. | |
| 8,656,496 B2 | 2/2014 | Artzi et al. | |
| 2004/0194077 A1* | 9/2004 | Bharadwaj | G06F 11/3612 717/158 |
| 2013/0290942 A1* | 10/2013 | Ishizaki | G06F 8/443 717/151 |
| 2015/0143344 A1* | 5/2015 | Davis | G06F 8/751 717/129 |
| 2015/0242301 A1* | 8/2015 | Ciocoi | G06F 11/3636 717/131 |

OTHER PUBLICATIONS

Mcintosh, et al., "Whole-Program Optimization of Global Variable Layout", In Proceedings of 15th International Conference on Parallel Architecture and Compilation Techniques, Sep. 19, 2006, 9 pages.

Wall, David W., "Predicting Program Behavior Using Real or Estimated Profiles", In Technical Note TN-18, Dec. 1990, 17 pages.

Bhowmik, et al., "A General Compiler Framework for Speculative Multithreaded Processors", In IEEE Transactions on Parallel and Distributed Systems, vol. 15, Issue 8, Aug. 2004, pp. 713-724.

\* cited by examiner

MEMORY 154

CURRENT SNAPSHOT 156

DATA STRUCTURE 157

COLLECTING PROFILE DATA FOR MODIFIED GLOBAL VARIABLES

BACKGROUND

Profiling is a type of dynamic program analysis that measures, for example, the memory used by a program, how many times a particular function is called and so on. Profile-guided optimization (PGO) is a compiler optimization technique in which profiling is used to improve program runtime performance. In contrast to traditional compiler optimization techniques that use the source code to make optimizations, profile-guided optimization uses the results of profiling test runs of instrumented programs to optimize the final generated code. As one example, "hotspots", sections of code that are executed frequently, can be identified and that code can be made more efficient.

SUMMARY

Profile data that can be used to identify the global variables that are modified during the execution of a training executable can be collected. A list of modified global variables computed from the profile data can be used to optimize a program. The precise information collected during the training run can be information that can identify addresses of global variables that were modified during the run. The list of global variables that have been modified can be provided to the compiler for the second optimizing compilation. This list of modified global variables can be used to enable the compiler to perform optimizations such as but not limited to placing all the modified global variables together in an area of memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In known forms of profile guided compiler optimization, source code is provided to a compiler and is compiled into a training executable. Input training data is provided to the training executable and profile statistics are collected when the training executable is run. The profile statistics are used to optimize the results of a second profile guided compilation for the program. Profile statistics collected by known profile guided optimizing compilers include counts such as: how many times a particular function or block of code was executed, how many times a branch was taken, and so on.

It may also be advantageous to know what global variables were modified during the execution of the training executable. For example, if this information were provided to the compiler for the second compilation, the compiler could place all the modified global variables together in memory which would typically improve performance of the program. It may be possible to determine some of the global variables that were modified during execution of a training executable by collecting profile data that identifies sections of code that were executed. For example, if a program executes function A and function A modifies Global Variable X, it can be deduced that Global Variable X has been modified because function A has been executed. This information is not complete because this approach misses indirect references to global variables in the code. For example, the address of a global variable may be stored in a data structure and another portion of code may use the stored address to modify the value of the global variable. This global variable modification will be missed when inferring that a global variable has been modified where the inference is based on the execution of a function that modified the global variable.

In contrast, in accordance with aspects of the subject matter described herein, the number of global variables that were modified during execution of the training executable can be precisely determined, including both the global variables that were modified directly and those that were modified indirectly. A background thread in the profile guided compiler optimization environment can be active during execution of the training executable. This background thread is referred to herein as the PGO worker thread. During startup of the training executable, global variables can be read into memory. The compiler can ensure that the area in memory in which the global variables are stored is delimited by a start marker and an end marker so that the global variable region of memory can be identified during execution of the training executable. The PGO worker thread can make a copy of the global variable region of memory such as but not limited to taking a snapshot that includes the area of memory holding the global variables. This snapshot reflects the initial baseline state of the global variables in memory before the program starts to execute and thus before the global variables have been modified from their initialized values.

The worker thread can periodically take snapshots of the region of memory within the markers. The worker thread can compare the current state of the global variables (the state captured in the most current snapshot) to the state of the global variables saved in the baseline snapshot. The differences can be noted. The worker thread can update the baseline state to the current state of the global variables. This may be done by overwriting the baseline snapshot with the contents of the area in memory delimited by the markers. This may be done by overwriting the baseline snapshot with the state reflected in the previously-taken current snapshot. The taking of snapshots can be triggered by events such as but not limited to startup, collecting profile data and shutdown. During shutdown one final update of modified variable information can be performed. Triggered, for example, by the unloading of the training executable from memory, the worker thread can compare the current state of the global variables (from the most current snapshot) to the baseline state of the global variables. If the global variable state has changed, this information can be added to the profile data.

Collecting Profile Data for Modified Global Variables

A worker thread can be initiated during execution of an instrumented executable. During startup, the worker thread can collect a baseline snapshot of the area of memory in which global variables are stored. Additional snapshots can be taken based on various triggers. The current snapshot can be compared with the baseline snapshot and the locations in memory whose contents have changed can be recorded. Addresses can be mapped back to global variables to create a list of global variables that have been modified. The list of global variables can be provided to the linker portion of the compiler in the second compilation with instructions to locate the global variables on the list together in an area of memory when generating the optimized executable. Placing all modified global variables together (co-locating global variables) is expected to improve execution performance of the optimized program.

Figure 1A:
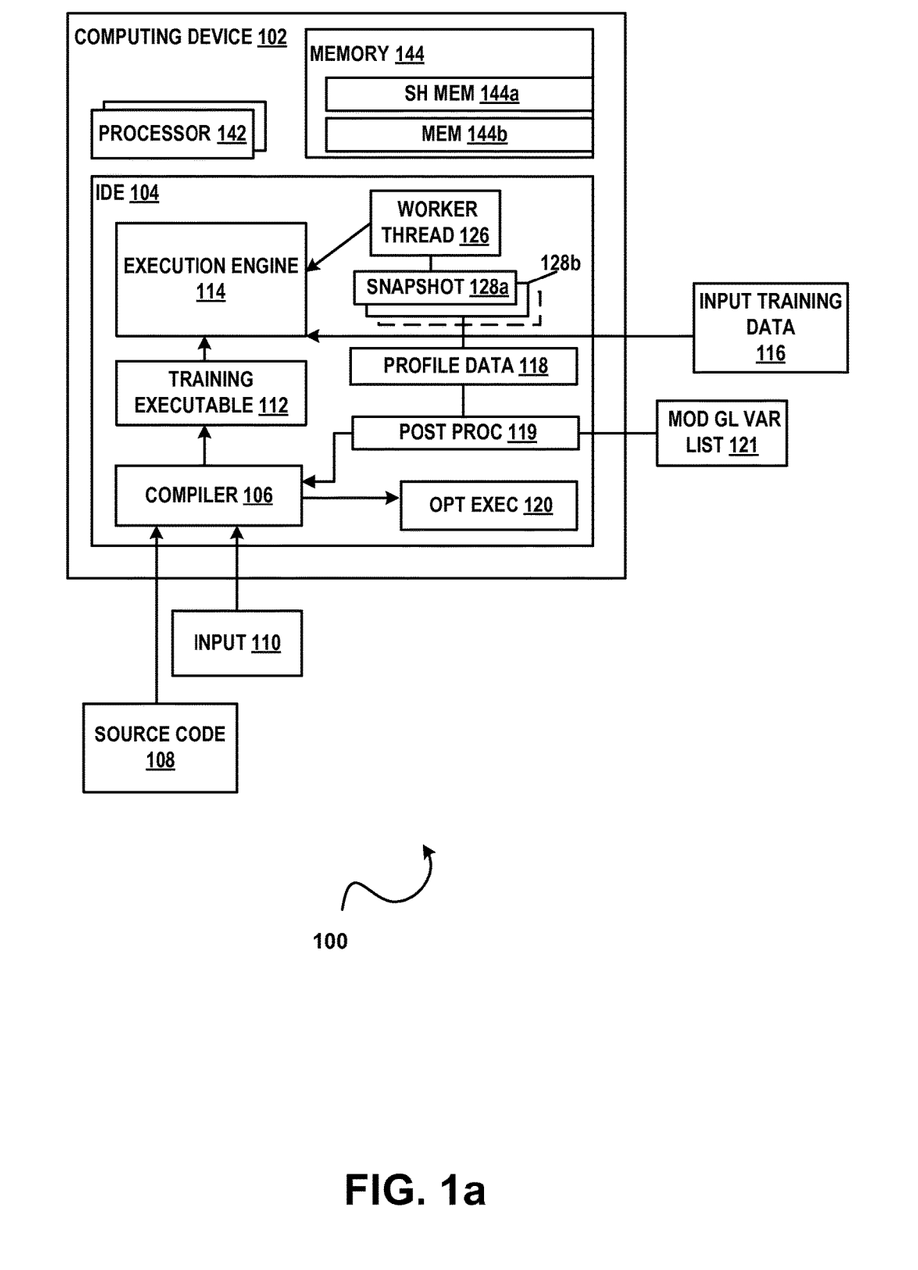
FIG. 1a illustrates an example of a system 100 comprising an optimizing compiler in accordance with aspects of the subject matter described herein.

FIG. 1a illustrates an example of a system 100 comprising an execution environment for a PGO compiler in accordance with aspects of the subject matter described herein. All or portions of system 100 may reside on one or more computers or computing devices such as the computers described below with respect to FIG. 3. System 100 may execute in whole or in part on a software development computer such as the software development computer described with respect to FIG. 4. System 100 or portions thereof may execute within an integrated development environment or IDE such as IDE 104 or may execute outside of an IDE. The IDE can be an IDE such as the one described with respect to FIG. 4 or can be any other IDE. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors. Memory 144 can include an area of memory in which global variables are stored such as memory 144b. Memory 144 can include an area of memory which is shared such as shared memory 144a, as described more fully below.

System 100 can include any combination of one or more of: a compiler such as compiler 106, an execution engine such as execution engine 114 and a post processor such as post processor 119. The compiler can be a background compiler, a parallel compiler or an incremental compiler, a plug-in, an add-in or extension to an IDE, parser, compiler or pre-processor. The compiler can compile source code such as source code 108 written in any programming language into native code, intermediate code, managed code or bytecode. The compiler can be a compiler such as compiler 106 that receives input such as input 110 that can instruct compiler 106 to generate a training executable such as for example, training executable 112 from source code such as source code 108. Input 110 may include directions to the compiler to create a marker that will be placed at the beginning of the portion of memory where global variables will be stored during execution of the instrumented (training) executable. Input may include directions to the compiler to create a marker that will be placed at the end of the portion of memory where global variables will be stored during execution of the instrumented executable. Compiler 106 can create a data structure (e.g., data structure 150 of FIG. 1b) that maps a global variable name to the address at which the global variable is stored in memory. This information can be stored in a profile data store that is part of the profile data 118. Compiler 106 can be a compiler that creates a training executable such as training executable 112. When executed training executable 112 can collect information that can be used to identify global variables that were modified during execution of the training executable 112.

Compiler 106 can instrument a training executable to initiate a worker thread such as worker thread 126 that performs one or more of the following: takes snapshots of the region of memory in which global variables are stored, compares state of global variables in consecutive snapshots, updates the baseline state of global variables and/or updates a data structure in memory (e.g., an array) that keeps track of the differences between snapshots, the differences reflecting addresses in memory whose contents have changed. The snapshots and/or data structure can comprise profile data. A post-processor can map the changed addresses back to variable names to identify global variables that were modified during execution of the training executable as described more fully below.

Training executable 112 can be an executable that is instrumented with instructions that collect profile data. For example, training executable 112 may be instrumented to collect information such as how many times a particular function, multiple functions or all functions are called, how many times a particular block or multiple blocks of code are accessed, how many times a particular feature or features are invoked and so on. Training executable 112 may be instrumented to collect profile information such as how many times a particular function is executed. Training executable 112 can be instrumented to collect information from which a list of modified global variables such as modified global variables list 121 can be computed.

The compiler can receive input that indicates the way the program is to be optimized in a second compilation, (e.g., optimize by location, placing the most frequently executed executable code in an accessible location in memory, optimize by placing all the modified global variables together in a particular area in memory, etc.) Alternatively, the compiler that receives the identified modified global variables can be a second compiler. In accordance with some aspects of the subject matter described herein, a user can provide a priority order for the selected options.

An execution engine such as execution engine 114 can receive a training dataset such as, for example, input training data 116. During execution of the training executable, profile data such as profile data 118 can be collected. In accordance with aspects of the subject matter described herein, the training executable can collect information from which a list of global variables that were modified during execution of the training executable can be derived. During execution of the training executable, a thread such as worker thread 126 can be initiated. At various points during execution of the training executable the worker thread can take a snapshot such as snapshot 128*a*, snapshot 128*b*, etc. Snapshot 128*a*, snapshot 128*b*. etc. can be snapshots of the contents of memory 144, or a portion thereof such as memory 144*b* which holds the global variables used by the training executable 112. Shared memory 144*a* refers to that part of memory 144 that holds profile data collected by the training executable 112. Comparing snapshots can indirectly determine global variables that changed by identifying addresses whose contents changed. Data that identifies the differences can be stored in shared memory 144*a*. Shared memory 144*a* can be an area of memory that is shared with a data collection process (e.g., a sweep utility responsible for capturing profile data or information from which profile data can be derived). By mapping changed global variable addresses back to the corresponding global variable names, a list of global variables (e.g., modified global variable list 121) that changed during execution of the training executable can be provided.

Figure 1B:
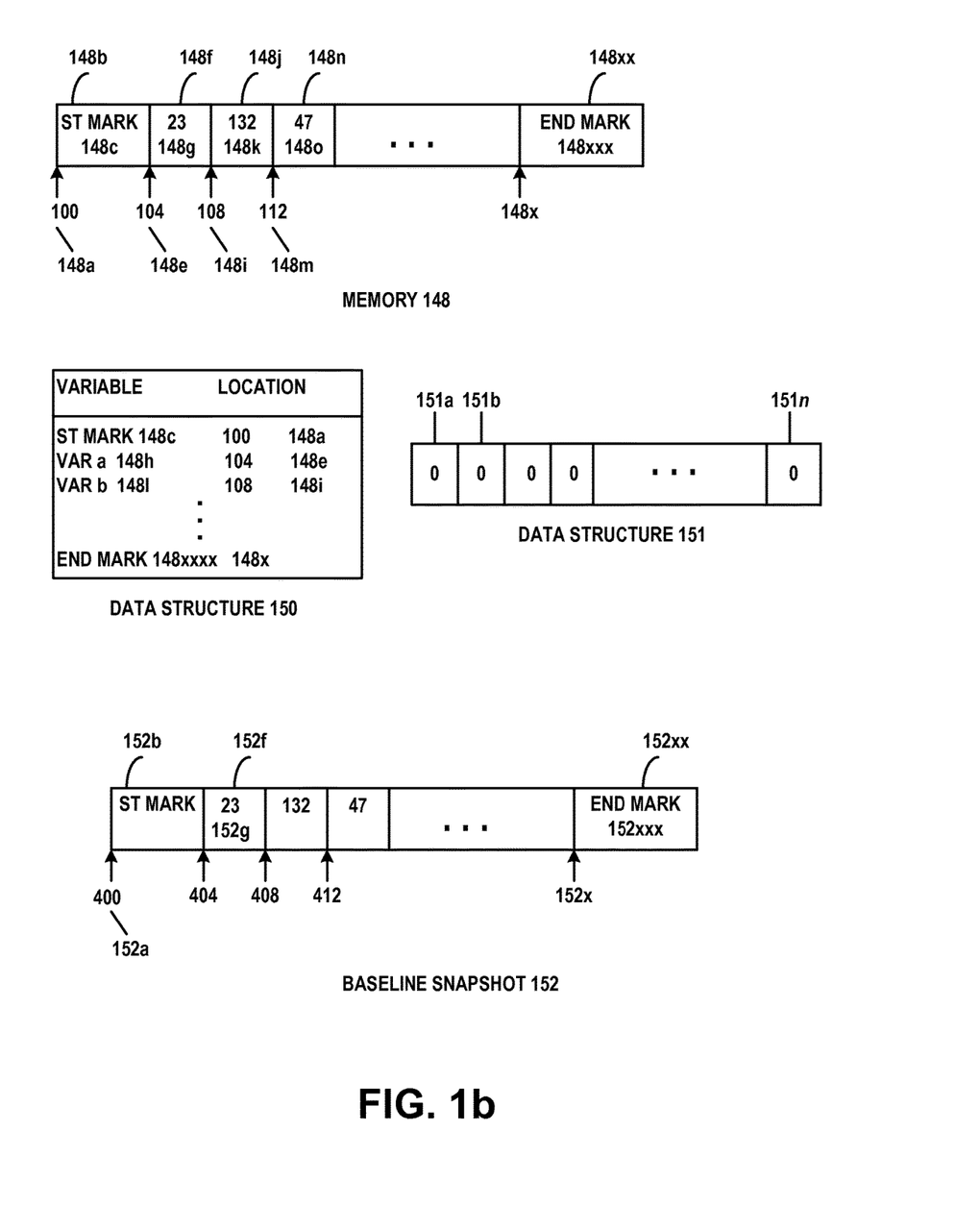
FIG. 1b illustrates examples of data structures in accordance with aspects of the subject matter described herein.

FIG. 1*b* illustrates data structures that can be used while collecting profile data in accordance with aspects of the subject matter described herein. It will be understood that while specific variable names, specific locations in memory, specific values, specific areas, specific chunks or specific sections of memory and so on are used while describing the data structures, this information is meant to be illustrative and to aid in understanding and in no way limits the concepts the subject matter describes or the way in which the concepts can be implemented.

When the training executable starts to execute, the global variables can be written to memory. A representation of a portion of memory, memory 148 holding global variables is illustrated in FIG. 1*b*. In memory 148 at location 100 148*a*, a first 4-byte area, area 148*b* holds the initial value of a start marker 148*c*. At location 104 148*e*, a second 4-byte area, area 148*f* holds the initial value 148*g* (e.g., 23) of a first program variable, var a. At location 108 148*i*, a third 4-byte area, area 148*j* holds the initial value 148*k* (e.g., 132) of a second program variable, var b. At location 112 148*m*, a third 4-byte area, area 148*n* holds the initial value 148*o* (e.g., 47) of a third variable, var c and so on until the final 4-byte area 148*xx* at location 148*x* holds the initial value of an end marker having an initial value 148*xxx*.

A data structure comprising variable names and the location in memory of each variable can be created by the compiler and provided to the training executable in the profile data data store. An example of the data structure is illustrated in FIG. 1*b* by data structure 150. Data structure 150 can include the name of a global variable and a location in memory (e.g., a 4-byte address) at which the global variable is stored. Data structure 150 indicates that the start marker 148*c* is located at memory address 100 148*a*, the first global program variable, var a 148*h* is located at memory address location 104 148*e*, the second global program variable, var b 148l is located at memory address 108 148*i* and so on to end marker 148*xxxx* located at memory address 148*x*.

Before the program starts to change the values of variables, a snapshot of the portion of memory that stores the global variables can be copied to a same-sized area of memory. This is the baseline snapshot, an example of which is represented in FIG. 1*b* by baseline snapshot 152. It will be appreciated that it contains the same data as memory 148 but starts at a different location, e.g., at location 400 152*a*. A data structure such as but not limited to an array can be created (e.g., in shared memory 144*a*) where each bit in the data structure represents a section of memory (e.g., a 4-byte word in memory). The size of the global variable area can be determined by subtracting the begin marker address from the end marker address. By dividing the result by 32 (because each bit in data structure 151 represents 4 bytes, so each byte represents 8*4 or 32 bytes) and rounding up, the size of the compressed data structure (e.g., array) can be determined Advantages of the reduced size of the data structure may include reducing the amount of memory needed and/or increasing execution speed.

Figure 1C:
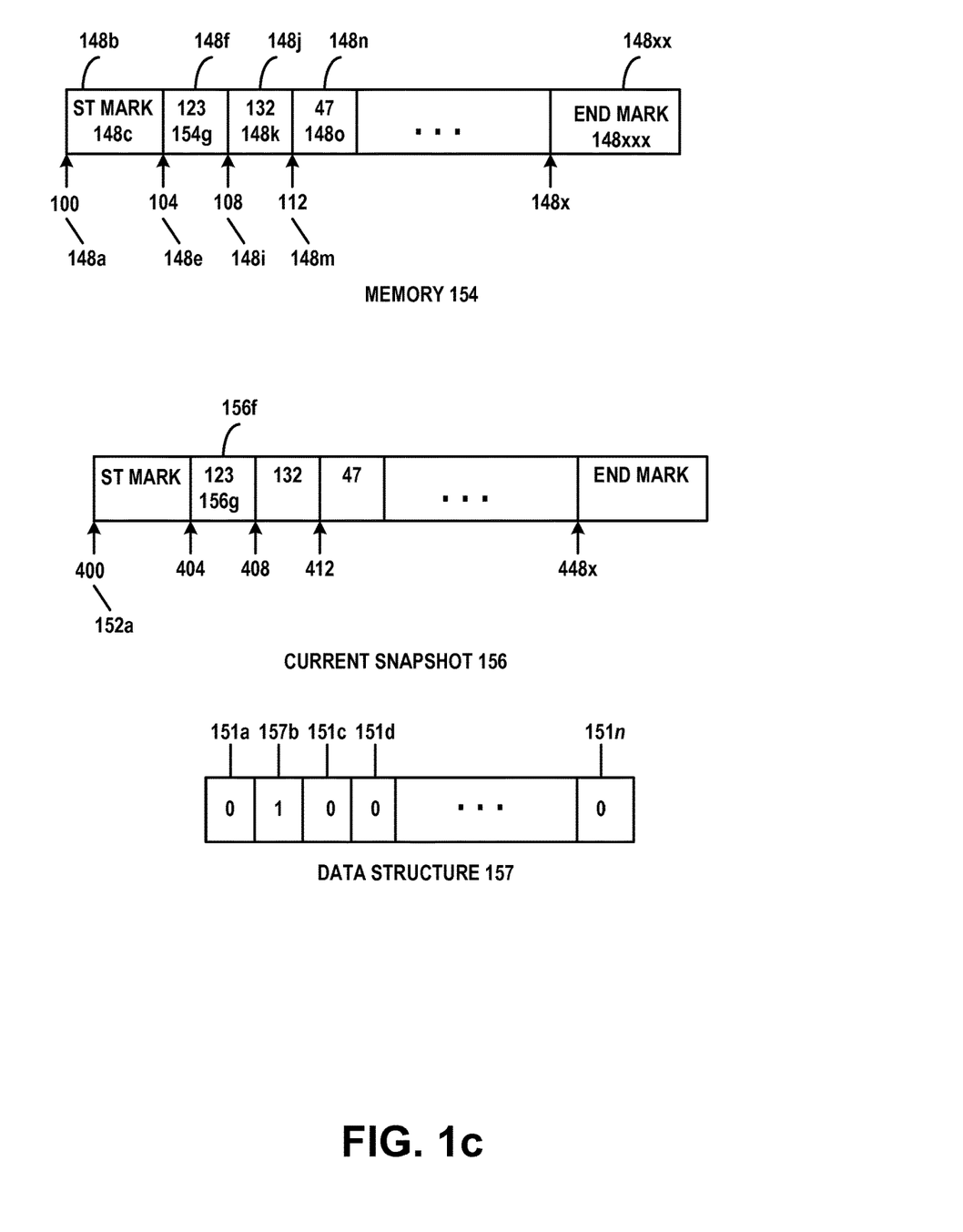
FIG. 1c illustrates more examples of data structures in accordance with aspects of the subject matter described herein.

Such a data structure is represented in FIG. 1*b* by data structure 151 in which bit 151*a* corresponds to the first four-byte area of memory 148 area 148*b* which is identical to the first four-byte area of baseline snapshot 152, area 152*b*. Similarly, bit 151*b* corresponds to the second four-byte area of baseline snapshot 152, area 152*f*, and to the second area 148*f* of memory 148, and so on until the final bit 151*n* corresponds to the final 4-byte area, area 152*xx* of baseline snapshot 152 at location 152*x* and to area 148*xx* of memory 148. The array can be initialized to 0. (That is, all the bits in the data structure can be set to 0.) After the baseline snapshot has been taken and the corresponding compressed representation data structure 151 has been built, the background worker thread can wait until it is triggered to capture a current snapshot. Suppose foreground processing changes the value of var a 148*h* from initial value 148*g* (e.g., 23) to modified value 154*g* (e.g., 123) as illustrated in FIG. 1*c* memory 154. Memory 148 has now been updated to the state illustrated in memory 154 in which the value of var a 148*h* is updated from the initial value 148*g* (e.g., 23) to modified value 154*g* (e.g., 123).

The taking of a current snapshot can be triggered by a profile data collection event. An example of a current snapshot is illustrated in current snapshot 156. The baseline snapshot (e.g., baseline snapshot 152) and the current snapshot (e.g., current snapshot 156) can be compared. In accordance with some aspects of the subject matter described herein, the baseline snapshot and the current snapshot can be compared in chunks (e.g., in sections which are each 4 bytes long). Comparing the baseline snapshot and the current snapshot can identify differences that indicate that the contents of the corresponding area in memory have changed. In FIG. 1*c* a comparison of the content of baseline snapshot 152 and the content of current snapshot 156 will result in detection of a difference in content at the second 4-byte area in each snapshot. In the example, the contents of area 152*f* of the initial baseline snapshot 152 has contents 152*g* of 23 and the content of area 156*f* of the current snapshot 156 has contents 156*g* of 123. In response to detecting a change in state, (e.g., the contents 152*g* of area 152*f* differs from the content 156*g* of area 156*f*, the bit (e.g., bit 157*b*) that corresponds to the area of changed content can be set to a value indicating that the content was modified. This is illustrated in data structure 157 by the contents of bit 157*b* being set to "1", indicating that the variable stored in the area corresponding to bit 157*b* was modified.

A pointer that points to the baseline snapshot can be reset so that it points to the current snapshot (e.g., to current snapshot 156), so the current snapshot becomes the baseline snapshot. The pointer to the current snapshot can be nulled out so that the pointer to the current snapshot points nowhere. Alternatively, the current contents of memory (e.g., memory 154) can be copied over the area of memory holding the baseline snapshot. That is, the same location in memory can be used for the baseline snapshot but the contents can be refreshed whenever a new current snapshot is taken. When the next snapshot is triggered, a current snapshot is captured, overwriting the area of memory holding the current snapshot. The process of comparing the baseline snapshot and the current snapshot can be performed. In response to detecting any change in state between the baseline and current snapshot, the content of the bit in the array corresponding to an area whose content changed can be set to 1 for all locations which had a change in state. Alternatively, the pointer to the baseline snapshot can be set to point to the location of the current snapshot and the pointer to the current snapshot can be set to null.

This process can be repeated until the main program processing is complete and the program starts to shut down. At this point a final current snapshot can be taken, the final current snapshot and the baseline snapshot can be compared, and the compressed representation data structure can be updated for any areas whose state changed. The compressed representation data structure can be stored as part of the profile data 118.

Profile data 118 can be provided to a post processor such as post processor 119. Profile data 118 can include a profile data store, data collected by the training executable or both a profile data store and data collected by the training executable. During post-processing the The compressed representation data structure and the list of variables and their locations in memory (e.g., data structure 150) can be used to determine a list of modified global variables. For example, consider data structure 157. The second bit, bit 157b is set to 1. That means that the global variable corresponding to the location of the second area of the baseline/current snapshot was modified during execution of the training executable. In accordance with aspects of the subject matter described herein, the compressed representation data structure can include bits which correspond to the areas of memory that have been modified. During the post processing performed by post processor 119, the list of global variables and their addresses (stored in the data profile data store by the compiler) can be correlated with the locations in memory that have been known to have been modified to determine the names of global variables which were modified during the execution of the training executable. The modified global variables can be provided to the compiler to alter layout of the global variables in the compilation of the optimized executable. The post processor can generate a list of modified global variables such as modified global variable list 121. This list can be provided to the compiler 106 or to a second compiler (not shown) to produce an optimized executable such as optimized executable 120. The list can be provided in a display or in a tangible form such as in a report, storage medium, etc. as is known in the art.

Figure 2A:
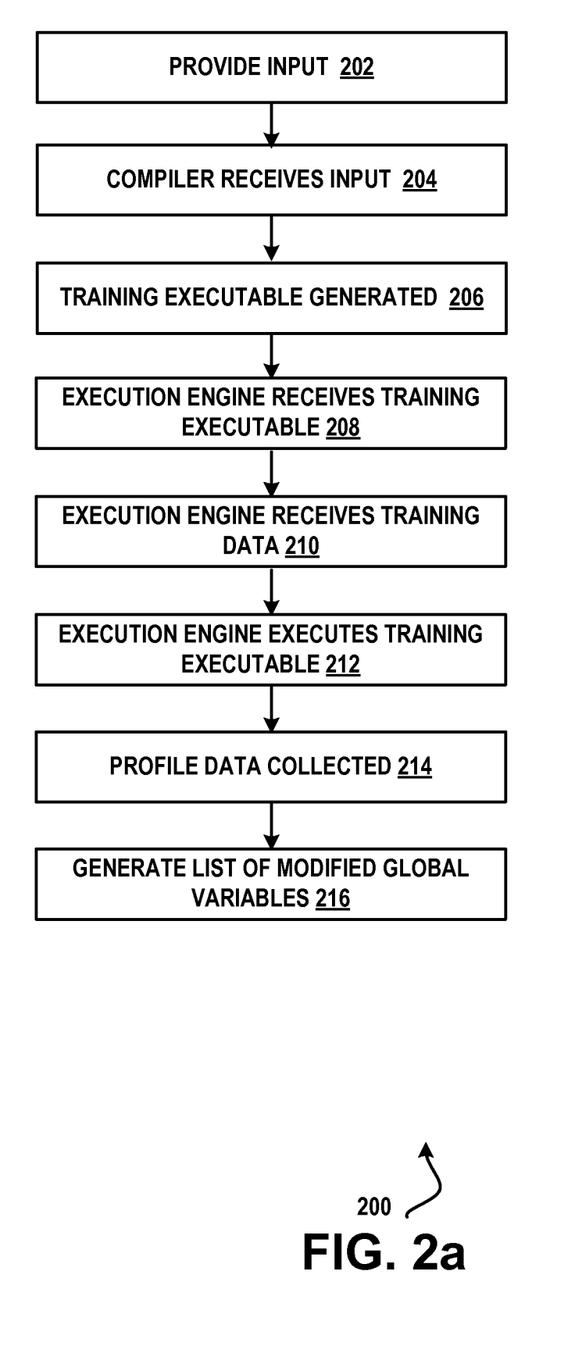
FIG. 2a illustrates an example of a method 200 comprising a method of performing profile guided compiler optimization in accordance with aspects of the subject matter disclosed herein.

FIG. 2a illustrates an example of a method 200 for optimizing a program in accordance with aspects of the subject matter described herein. The method described in FIG. 2a can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

As described more fully above, at operation 202 source code and input that indicates that an instrumented training executable is to be built can be provided to a compiler. At operation 204 the input and source code can be received by the compiler. At operation 206 the compiler can generate an instrumented training executable. At operation 208 an execution engine can receive the training executable. At operation 210 a set of input training data can be received. At operation 212 the execution engine can initiate execution of the training executable using the training data. At operation 214 profile data can be collected. At operation 216 information comprising a list of modified global variable names can be derived from the collected profile data as described more fully above.

Figure 2B:
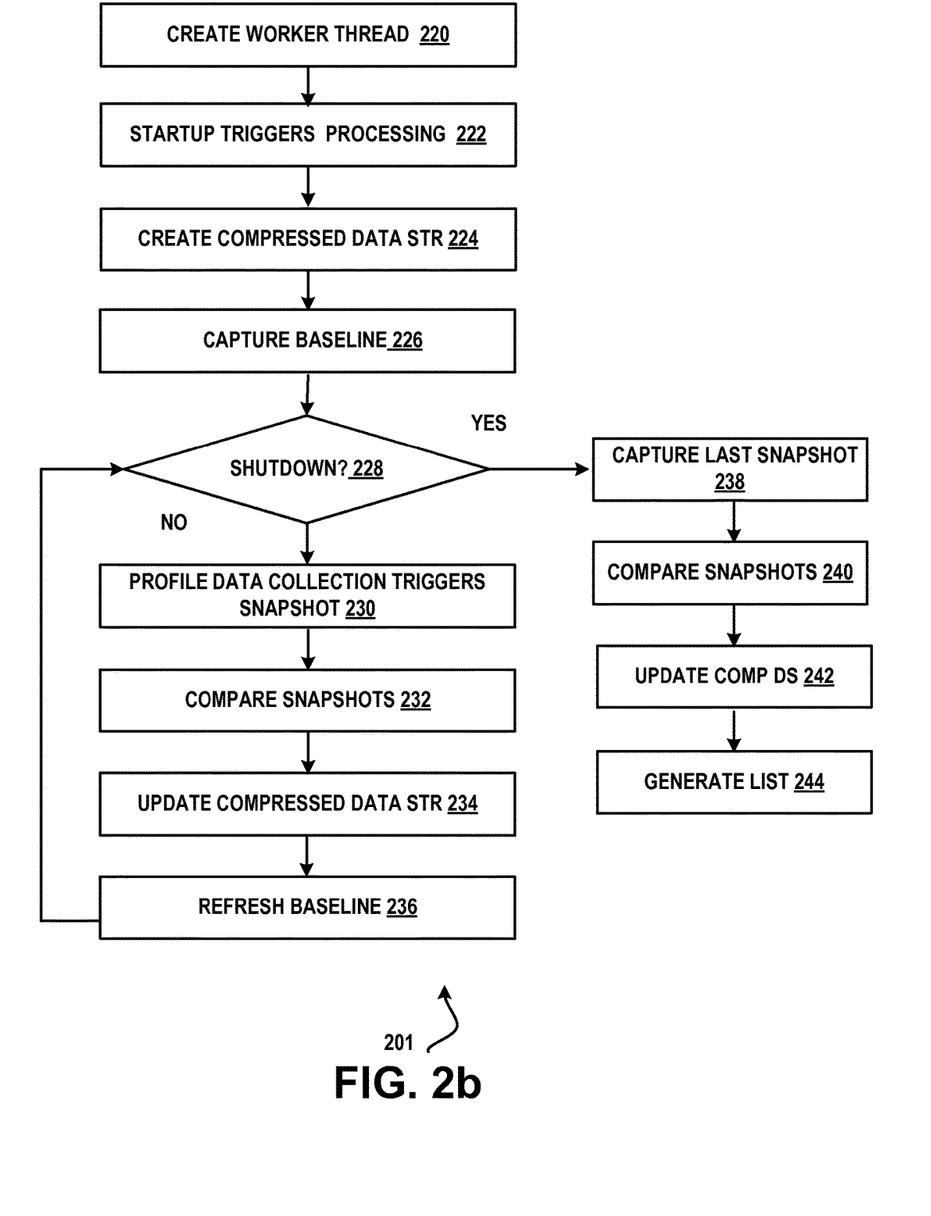
FIG. 2b illustrates an example of a method 201 comprising a more detailed description of a portion of method 200 in accordance with aspects of the subject matter disclosed herein.

FIG. 2b illustrates a more detailed example of portions of method 200 in accordance with aspects of the subject matter described herein. The method described in FIG. 2b can be practiced by a system such as but not limited to the one described with respect to FIG. 1a using data structures examples of which are described with respect to FIGS. 1b and 1c. While method 201 describes a series of operations that are performed in a sequence, it is to be understood that method 201 is not limited by the order of the sequence depicted. For instance, some operations may occur in a different order than that described. In addition, one operation may occur concurrently with another operation. In some instances, not all operations described are performed.

At operation 204 in method 200 an optimizing compiler can receive instructions that direct the compiler to delimit the area in memory in which the global variables are stored. The area of memory in which global variables are stored can be identified in any suitable way. In accordance with some aspects of the subject matter described herein, the instructions may include instructions that direct the compiler to put start and end markers in memory to delimit the region of memory in which global variables are stored. The markers can be used during execution of the training executable to determine the region of memory to watch for modifications. In accordance with some aspects of the subject matter described herein, the compiler can ensure that the markers are the first and last global variable in memory. The instructions may include instructions that instruct the compiler to instrument the training executable to do the following operations. At operation 220, a background thread (e.g., a PGO worker thread) can be initiated. At operation 222, startup of execution of a program such as the training executable can trigger the background thread to perform tasks. At operation 224 the worker thread can create a compressed representation data structure such as but not limited to an array as described more fully above. The data structure can be initialized to a state that indicates that the contents of the locations represented have not changed. (For example, the bits of the array can be initialized to 0.) At operation 226 the shared memory holding the global variables can be copied to create a baseline snapshot. At operation 228, in the absence of receiving a notification of program shutdown, processing can continue at 230. At operation 230 in response to an event such as but not limited to collection of profile data, a current snapshot can be taken. At operation 232 the difference between the current snapshot and the baseline snapshot can be determined. At operation 234 the appropriate section(s) of the compressed data structure can be modified to indicate that the contents of the location or locations represented have changed. For example, the bit in the array corresponding to the address of the global variable that was modified can be set to 1. At operation 236 the baseline snapshot can be refreshed (updated to current state).

Processing can return to operation 228. At operation 228 in response to receiving a notification that the program is shutting down, at operation 238 a final current snapshot can be captured. At operation 240 the baseline snapshot and the final current snapshot can be compared. At operation 242 the differences can be reflected in the compressed data structure (e.g., array). At operation 244 the array and a list of global variable names and their addresses can be used to generate a list of modified global variables. This list can be used to optimize a second compilation of the program.

The system described herein includes one or more processors to which a memory is connected. The system includes one or more program modules loaded into the memory. The one or more program modules include a profile guided optimizing compiler that instruments a training executable to collect profile data from which names of global variables modified during execution of the training executable is provided. The system can be a system in which the profile guided optimizing compiler instruments the training executable to capture a baseline snapshot that is a copy of global variables in memory at startup of execution of the training executable. The system can be a system in which the profile guided optimizing compiler instruments the training executable to capture a current snapshot comprising a copy of global variables in memory in response to collection of profile data. The system can be a system in which the profile guided optimizing compiler instruments the training executable to compare the baseline snapshot with the current snapshot to identify addresses of global variables whose contents have changed between the baseline snapshot and the current snapshot. The system can be a system in which the profile guided optimizing compiler instruments the training executable to capture a final snapshot in response to program shutdown of the training executable. The system can be a system in which the profile guided optimizing compiler instruments the training executable to create a data structure in which state of a bit in the data structure represents a change in a section of the memory, the section holding global variables. The system can be a system in which one or more program modules generate a list of the names of modified global variables from the profile data collected by the training executable.

A method of using a system such as the one described above can include inserting instrumentation into a training executable by a profile guided optimizing compiler executing on a computer, the instrumentation comprising instructions to collect profile data from which a list of global variables modified during execution of the training executable is determined. The method can include delimiting an area of the memory in which the global variables are stored by placing a start marker at a beginning of the area and placing an end marker at the end of the area. The method can include inserting into the training executable instructions to collect a baseline snapshot of global variables at program startup. The method can include inserting into the training executable instructions to collect a current snapshot of global variables triggered by profile data collection. The method can include inserting into the training executable instructions to determine the differences between the baseline snapshot and the current snapshot, the differences comprising an indication of at least one location in an area of memory in which global variables are stored, the indication indicating that content of the at least one location has changed. The method can include inserting into the training executable instructions to create a data structure in which state of a part of the data structure such as a bit in the data structure represents a change in a section of memory holding global variables.

Computer-readable instructions stored on a computer-readable storage medium can, when executed on a computer, insert instrumentation into a training executable, the instrumentation comprising instructions to collect profile data from which a list of global variables modified during execution of the training executable is determined. The storage medium can include instructions that insert instrumentation into a training executable, the instrumentation comprising instructions to collect profile data comprising snapshots of an area of memory holding values of global variables. The storage medium can include instructions that insert instrumentation into a training executable, the instrumentation comprising instructions to collect profile data comprising snapshots of an area of memory holding values of global variables, a first snapshot comprising a baseline snapshot and a second snapshot comprising a current snapshot taken during profile data collection. The storage medium can include instructions that insert instrumentation into a training executable, the instrumentation comprising instructions to compare the first snapshot to the second snapshot to determine differences between the first snapshot and the second snapshot, the differences comprising at least one location in an area of memory in which global variables are stored, in which contents of the at least one location has changed. The storage medium can include instructions that insert instrumentation into a training executable, the instrumentation comprising instructions to create a data structure in which state of a bit in the data structure represents a change in a section of memory holding global variables. The storage medium can include instructions that insert instrumentation into a training executable, the instrumentation comprising instructions to trigger taking a snapshot of an area of memory holding global variables at program startup, program shutdown and when profile data is collected. The storage medium can include instructions that insert instrumentation into a training executable, the instrumentation comprising instructions to alter a value of a bit in a data structure in which state of a bit in the data structure represents a change in a section of memory holding global variables. The storage medium can include instructions that map the altered bit to a global variable name. The storage medium can include instructions that provide the global variable name to a profile guided optimizing compiler.

Example of a Suitable Computing Environment

Figure 3:
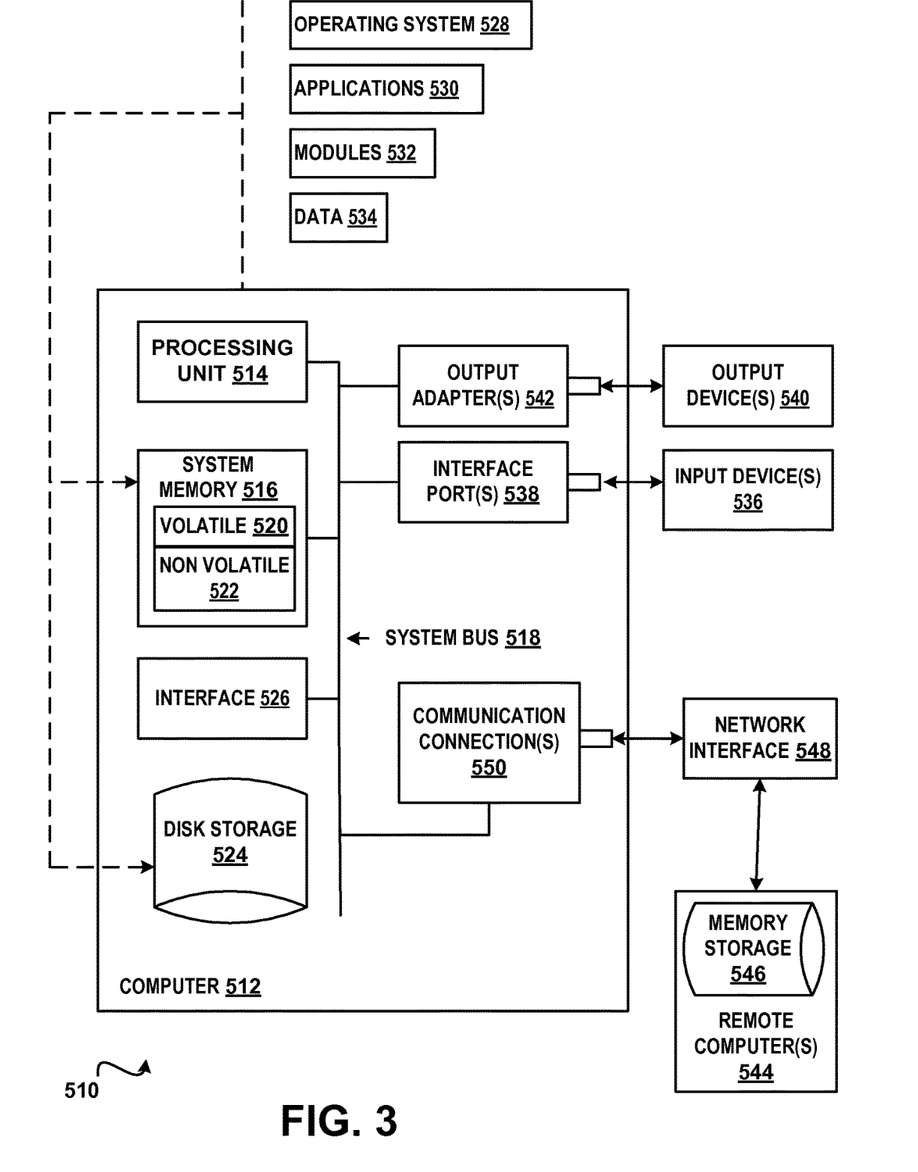
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
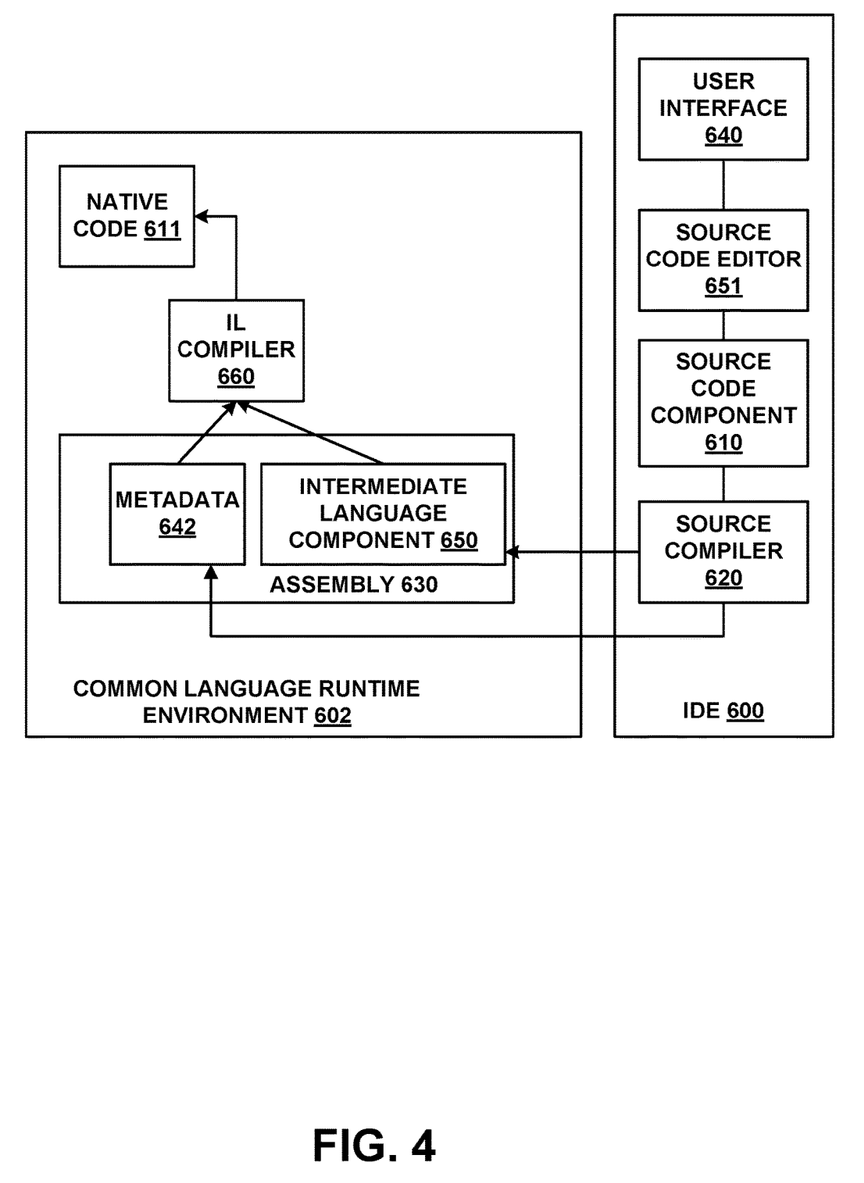
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    at least one processor:
    a memory connected to the at least one processor; and
    a profile guided optimizing compiler that instruments a training executable to collect profile data from which names of global variables modified during execution of the training executable is provided, wherein the profile data includes a plurality of snapshots of a global variable storage location taken at different points in the execution of the training executable,
    wherein the profile guided optimizing compiler uses the plurality of snapshots of the global variable storage location to determine whether a global variable has been modified by mapping an address in the global variable storage location whose content has been modified to a corresponding global variable name,
    wherein the profile guided optimizing compiler optimizes a program associated with the training executable using a list of the modified global variables collected by the training executable, and
    wherein the profile guided optimizing compiler locates the modified global variables into a separate memory area dedicated for the modified global variables.

2. The system of claim 1, wherein the profile guided optimizing compiler instruments the training executable to capture a baseline snapshot comprising a copy of global variables in memory at startup of execution of the training executable.

3. The system of claim 2, wherein the profile guided optimizing compiler instruments the training executable to capture a current snapshot comprising a copy of global variables in memory in response to collection of profile data.

4. The system of claim 3, wherein the profile guided optimizing compiler instruments the training executable to compare the baseline snapshot with the current snapshot to identify addresses of global variables whose contents have changed between the baseline snapshot and the current snapshot.

5. The system of claim 4, wherein the profile guided optimizing compiler instruments the training executable to capture a final snapshot in response to program shutdown of the training executable.

6. The system of claim 1, wherein the profile guided optimizing compiler instruments the training executable to create a data structure in which state of a bit in the data structure represents a change in a section of the memory, the section holding global variables.

7. The system of claim 1, wherein the at least one processor maps the altered bit to a global variable name and provides the global variable name to the profile guided optimizing compiler.

8. A method comprising:
    inserting instrumentation into a training executable by a profile guided optimizing compiler executing on a computer, the instrumentation comprising instructions to collect profile data from which a list of global variables modified during execution of the training executable is determined, wherein the profile data includes one or more snapshots of a global variable storage location taken at different points in the execution of the training executable;
    determining, by the profile guided optimizing compiler, whether a global variable has been modified by mapping an address in the global variable storage location whose content has been modified to a corresponding global variable name;
    optimizing a program associated with the training executable using a list of the modified global variables collected by the training executable; and
    locating, by the profiled guided optimizing compiler, the modified global variables into a distinct memory area dedicated solely to the modified global variables.

9. The method of claim 8, further comprising:
    delimiting an area of memory in which the global variables are stored by placing a start marker at a beginning of the area and placing an end marker at the end of the area.

10. The method of claim 8, further comprising:
inserting into the training executable instructions to collect a baseline snapshot of global variables at program startup.

11. The method of claim 10, further comprising:
inserting into the training executable instructions to collect a current snapshot of global variables triggered by profile data collection.

12. The method of claim 11, further comprising:
inserting into the training executable instructions to determine differences between the baseline snapshot and the current snapshot, the differences comprising an indication of at least one location in an area of memory in which global variables are stored, the indication indicating content of the at least one location has changed.

13. The method of claim 8, further comprising:
inserting into the training executable instructions to create a data structure in which state of a bit in the data structure represents a change in a section of memory holding global variables.

14. A device comprising at least one processor and a memory, the at least one processor configured to:
insert instrumentation into a training executable, the instrumentation comprising instructions to collect profile data from which a list of global variables modified during execution of the training executable is determined, wherein the profile data includes at least one snapshot of a global variable storage location taken at different times in the execution of the training executable;
determine whether a global variable has been modified by mapping an address in the global variable storage location whose content has been modified to a corresponding global variable name;
optimize a program associated with the training executable using a list of the modified global variables collected from the training executable; and
locate the modified global variables in a separate dedicated memory area.

15. The device of claim 14, wherein the at least one processor is further configured to:
insert instrumentation into a training executable, the instrumentation comprising instructions to collect profile data comprising snapshots of an area of memory holding values of global variables.

16. The device of claim 14, wherein the at least one processor is further configured to:
insert instrumentation into a training executable, the instrumentation comprising instructions to collect profile data comprising snapshots of an area of memory holding values of global variables, a first snapshot comprising a baseline snapshot and a second snapshot comprising a current snapshot taken during profile data collection; and
insert instrumentation into a training executable, the instrumentation comprising instructions to compare the first snapshot to the second snapshot to determine differences between the first snapshot and the second snapshot, the differences comprising at least one location in an area of memory in which global variables are stored, in which contents of the at least one location has changed.

17. The device of claim 16, wherein the at least one processor is further configured to:
insert instrumentation into a training executable, the instrumentation comprising instructions to create a data structure in which state of a bit in the data structure represents a change in a section of memory holding global variables.

18. The device of claim 14, wherein the at least one processor is further configured to:
insert instrumentation into a training executable, the instrumentation comprising instructions to trigger taking a snapshot of an area of memory holding global variables at program startup, program shutdown and when profile data is collected.

19. The device of claim 14, wherein the at least one processor is further configured to:
insert instrumentation into a training executable, the instrumentation comprising instructions to alter a value of a bit in a data structure in which state of a bit in the data structure represents a change in a section of memory holding global variables.

20. The device of claim 19, wherein the at least one processor is further configured to:
map the altered bit to a global variable name; and
provide the global variable name to a profile guided optimizing compiler.

* * * * *